(12) United States Patent
Walters et al.

(10) Patent No.: US 11,836,537 B2
(45) Date of Patent: Dec. 5, 2023

(54) SYSTEMS AND METHODS TO IDENTIFY NEURAL NETWORK BRITTLENESS BASED ON SAMPLE DATA AND SEED GENERATION

(71) Applicant: CAPITAL ONE SERVICES, LLC, McLean, VA (US)

(72) Inventors: Austin Walters, Savoy, IL (US); Vincent Pham, Champaign, IL (US); Galen Rafferty, Mahomet, IL (US); Anh Truong, Champaign, IL (US); Mark Watson, Urbana, IL (US); Jeremy Goodsitt, Champaign, IL (US)

(73) Assignee: Capital One Services, LLC, McLean, VA (US)

( * ) Notice: Subject to any disclaimer, the term of this patent is extended or adjusted under 35 U.S.C. 154(b) by 673 days.

(21) Appl. No.: 16/715,924

(22) Filed: Dec. 16, 2019

(65) Prior Publication Data
US 2020/0117998 A1 Apr. 16, 2020

Related U.S. Application Data

(63) Continuation of application No. 16/263,141, filed on Jan. 31, 2019, now Pat. No. 10,521,719.
(Continued)

(51) Int. Cl.
*G06F 9/54* (2006.01)
*G06N 20/00* (2019.01)
(Continued)

(52) U.S. Cl.
CPC ............... *G06F 9/541* (2013.01); *G06F 8/71* (2013.01); *G06F 9/54* (2013.01); *G06F 9/547* (2013.01);
(Continued)

(58) Field of Classification Search
CPC ........... G06N 3/02; G06N 3/04; G06N 20/00; G06N 99/005; G06N 3/08
See application file for complete search history.

(56) References Cited

U.S. PATENT DOCUMENTS 8,392,418 B2   3/2013   Birdwell et al.
8,375,032 B2   12/2013  Birdwell et al.
(Continued)

OTHER PUBLICATIONS

Beaulieu-Jones et al., "Privacy-preserving generative deep neural networks support 1 clinical data sharing", 7/52017, bioRxiv, total pp. 40, http://dx.do8i.org/10.1101/159756 (Year: 2017).
(Continued)

*Primary Examiner* — Hau H Hoang
(74) *Attorney, Agent, or Firm* — FINNEGAN, HENDERSON, FARABOW, GARRETT & DUNNER, LLP

(57) ABSTRACT

Systems and methods for determining neural network brittleness are disclosed. For example, the system may include one or more memory units storing instructions and one or more processors configured to execute the instructions to perform operations. The operations may include receiving a modeling request comprising a preliminary model and a dataset. The operations may include determining a preliminary brittleness score of the preliminary model. The operations may include identifying a reference model and determining a reference brittleness score of the reference model. The operations may include comparing the preliminary brittleness score to the reference brittleness score and generating a preferred model based on the comparison. The operations may include providing the preferred model.

20 Claims, 7 Drawing Sheets

Related U.S. Application Data

(60) Provisional application No. 62/694,968, filed on Jul. 6, 2018.

(51) Int. Cl.

| | |
|---|---|
| G06F 17/16 | (2006.01) |
| G06N 3/04 | (2023.01) |
| G06F 11/36 | (2006.01) |
| G06N 3/088 | (2023.01) |
| G06F 21/62 | (2013.01) |
| G06N 5/04 | (2023.01) |
| G06F 17/15 | (2006.01) |
| G06T 7/194 | (2017.01) |
| G06T 7/254 | (2017.01) |
| G06T 7/246 | (2017.01) |
| G06F 16/2455 | (2019.01) |
| G06F 16/22 | (2019.01) |
| G06F 16/28 | (2019.01) |
| G06F 16/906 | (2019.01) |
| G06F 16/93 | (2019.01) |
| G06F 16/903 | (2019.01) |
| G06F 16/9038 | (2019.01) |
| G06F 16/9032 | (2019.01) |
| G06F 16/25 | (2019.01) |
| G06F 16/335 | (2019.01) |
| G06F 16/242 | (2019.01) |
| G06F 16/248 | (2019.01) |
| G06F 30/20 | (2020.01) |
| G06F 40/166 | (2020.01) |
| G06F 40/117 | (2020.01) |
| G06F 40/20 | (2020.01) |
| G06F 8/71 | (2018.01) |
| G06F 17/18 | (2006.01) |
| G06F 21/55 | (2013.01) |
| G06F 21/60 | (2013.01) |
| G06N 7/00 | (2023.01) |
| G06Q 10/04 | (2023.01) |
| G06T 11/00 | (2006.01) |
| H04L 9/40 | (2022.01) |
| H04L 67/306 | (2022.01) |
| H04L 67/00 | (2022.01) |
| H04N 21/234 | (2011.01) |
| H04N 21/81 | (2011.01) |
| G06N 5/00 | (2023.01) |
| G06N 5/02 | (2023.01) |
| G06V 30/196 | (2022.01) |
| G06F 18/22 | (2023.01) |
| G06F 18/23 | (2023.01) |
| G06F 18/24 | (2023.01) |
| G06F 18/40 | (2023.01) |
| G06F 18/213 | (2023.01) |
| G06F 18/214 | (2023.01) |
| G06F 18/21 | (2023.01) |
| G06F 18/20 | (2023.01) |
| G06F 18/2115 | (2023.01) |
| G06F 18/2411 | (2023.01) |
| G06F 18/2415 | (2023.01) |
| G06N 3/044 | (2023.01) |
| G06N 3/045 | (2023.01) |
| G06N 7/01 | (2023.01) |
| G06V 30/194 | (2022.01) |
| G06V 10/98 | (2022.01) |
| G06V 10/70 | (2022.01) |
| G06N 3/06 | (2006.01) |
| G06N 3/08 | (2023.01) |

(52) U.S. Cl.
CPC ...... *G06F 11/3608* (2013.01); *G06F 11/3628* (2013.01); *G06F 11/3636* (2013.01); *G06F 16/2237* (2019.01); *G06F 16/2264* (2019.01); *G06F 16/248* (2019.01); *G06F 16/2423* (2019.01); *G06F 16/24568* (2019.01); *G06F 16/254* (2019.01); *G06F 16/258* (2019.01); *G06F 16/283* (2019.01); *G06F 16/285* (2019.01); *G06F 16/288* (2019.01); *G06F 16/335* (2019.01); *G06F 16/906* (2019.01); *G06F 16/9038* (2019.01); *G06F 16/90332* (2019.01); *G06F 16/90335* (2019.01); *G06F 16/93* (2019.01); *G06F 17/15* (2013.01); *G06F 17/16* (2013.01); *G06F 17/18* (2013.01); *G06F 18/213* (2023.01); *G06F 18/214* (2023.01); *G06F 18/217* (2023.01); *G06F 18/2115* (2023.01); *G06F 18/2148* (2023.01); *G06F 18/2193* (2023.01); *G06F 18/22* (2023.01); *G06F 18/23* (2023.01); *G06F 18/24* (2023.01); *G06F 18/2411* (2023.01); *G06F 18/2415* (2023.01); *G06F 18/285* (2023.01); *G06F 18/40* (2023.01); *G06F 21/552* (2013.01); *G06F 21/60* (2013.01); *G06F 21/6245* (2013.01); *G06F 21/6254* (2013.01); *G06F 30/20* (2020.01); *G06F 40/117* (2020.01); *G06F 40/166* (2020.01); *G06F 40/20* (2020.01); *G06N 3/04* (2013.01); *G06N 3/044* (2023.01); *G06N 3/045* (2023.01); *G06N 3/06* (2013.01); *G06N 3/08* (2013.01); *G06N 3/088* (2013.01); *G06N 5/00* (2013.01); *G06N 5/02* (2013.01); *G06N 5/04* (2013.01); *G06N 7/00* (2013.01); *G06N 7/01* (2023.01); *G06N 20/00* (2019.01); *G06Q 10/04* (2013.01); *G06T 7/194* (2017.01); *G06T 7/246* (2017.01); *G06T 7/248* (2017.01); *G06T 7/254* (2017.01); *G06T 11/001* (2013.01); *G06V 10/768* (2022.01); *G06V 10/993* (2022.01); *G06V 30/194* (2022.01); *G06V 30/1985* (2022.01); *H04L 63/1416* (2013.01); *H04L 63/1491* (2013.01); *H04L 67/306* (2013.01); *H04L 67/34* (2013.01); *H04N 21/23412* (2013.01); *H04N 21/8153* (2013.01); *G06T 2207/10016* (2013.01); *G06T 2207/20081* (2013.01); *G06T 2207/20084* (2013.01)

(56) References Cited

U.S. PATENT DOCUMENTS

| | | |
|---|---|---|
| 2002/0103793 A1 | 8/2002 | Koller et al. |
| 2008/0270363 A1 | 10/2008 | Hunt et al. |
| 2008/0288889 A1 | 11/2008 | Hunt et al. |
| 2009/0018996 A1 | 1/2009 | Hunt et al. |
| 2010/0332210 A1 | 12/2010 | Birdwell et al. |
| 2010/0332474 A1 | 12/2010 | Birdwell et al. |
| 2011/0072411 A1 | 3/2011 | Cornell |
| 2012/0278353 A1 | 11/2012 | Carrato et al. |
| 2012/0283885 A1 | 11/2012 | Mannar et al. |
| 2013/0124526 A1 | 5/2013 | Birdwell et al. |
| 2013/0159309 A1 | 6/2013 | Birdwell et al. |
| 2013/0159310 A1 | 6/2013 | Birdwell et al. |
| 2014/0201126 A1 | 7/2014 | Zadeh et al. |
| 2015/0032761 A1 | 1/2015 | Pasternack |
| 2016/0078339 A1* | 3/2016 | Li .................. G06N 3/084 706/20 |
| 2016/0092476 A1 | 3/2016 | Stojanovic et al. |
| 2016/0132787 A1 | 5/2016 | Drevo et al. |
| 2016/0179787 A1 | 6/2016 | Deleeuw |

(56) References Cited

U.S. PATENT DOCUMENTS

| | | |
|---|---|---|
| 2017/0109676 A1 | 4/2017 | Marcu et al. |
| 2017/0236073 A1 | 8/2017 | Borisyuk et al. |
| 2018/0173730 A1 | 6/2018 | Copenhaver et al. |
| 2018/0192046 A1 | 7/2018 | Teo et al. |
| 2018/0204111 A1 | 7/2018 | Zadeh et al. |
| 2018/0240041 A1* | 8/2018 | Koch .................. G06N 3/126 |
| 2018/0255082 A1 | 9/2018 | Ostergaard |
| 2018/0357543 A1 | 12/2018 | Brown et al. |
| 2019/0147371 A1 | 5/2019 | Deo et al. |
| 2020/0302292 A1* | 9/2020 | Tseng .................. G06N 3/08 |

OTHER PUBLICATIONS

Park et al., "Data Synthesis based on Generative Adversarial Networks", Aug. 2018, Proceedings of the VLDB Endowment, vol. 11, No. 10, pp. 1071-1083 (Year: 2018).

Malekzadeh et al., Replacement AutoEncoder: A Privacy-Preserving Algorithm for Sensory Data Analysis, 2018 IEEE/ACM Third International Conference on Internet-of-Things Design and Implementation, pp. 166-176 (Year: 2018).

Brkic et al., "I Know That Person: Generative Full Body and Face De-Identification of People in Images," 2017 IEEE Conference on Computer Vision and Pattern Recognition Workshops, pp. 1319-1328 (Year: 2017).

\* cited by examiner

SYSTEMS AND METHODS TO IDENTIFY NEURAL NETWORK BRITTLENESS BASED ON SAMPLE DATA AND SEED GENERATION

CROSS REFERENCE TO RELATED APPLICATIONS

This application is a continuation of U.S. application Ser. No. 16/263,141, filed Jan. 31, 2019, which claims the benefit of U.S. Provisional Application No. 62/694,968, filed Jul. 6, 2018. The disclosures of the aforementioned applications are expressly incorporated herein by reference in their entirety.

This application relates to U.S. patent application Ser. No. 16/151,385 filed on Oct. 4, 2018, and titled Data Model Generation Using Generative Adversarial Networks. This application also relates to U.S. application Ser. No. 16/207,060 filed Nov. 30, 2018 and titled Systems and Methods for Indexing and Searching Rule-Based Models. This application additionally relates to U.S. patent application Ser. No. 16/251,867 filed on Jan. 18, 2019 and titled Dataset Connector and Crawler to Identify Data Lineage and Segment Data. The disclosures of the aforementioned applications are expressly incorporated herein by reference in their entirety.

BACKGROUND

Modern computing often use models, including machine learning models (e.g., neural network models), to produce a desired outcome (i.e., an analysis goal or analysis topic), given a dataset. Organizations frequently devote large amounts of resources to training these models and generate large numbers of models to analyze many large datasets. In many cases, the datasets comprise the same or similar data, and the models may perform similar functions or possess similar features (e.g., the same type of hyperparameter). Organizations may wish to use or generate a model to perform a new task (i.e., to perform a task it was not previously trained to perform). For example, the new task may be to analyze a new dataset or to produce a new outcome (analysis result).

As the numbers of models and datasets grow, it can become difficult to organize models and datasets in a meaningful way. As a result, computing systems may inefficiently spend time training new models when existing models are available. Further, computing systems may be unable to use information related to existing models to identify ways to improve model performance.

Model "brittleness" can cause problems when training a model to perform a new task. A "brittle" model is a model that may fail to converge during training. For example, a brittle model may work well for identifying faces in one person's photo album but may not work well for another person's photo album, without extensive retraining. In some cases, it can be difficult or impossible to train brittle models without human supervision (e.g., training models to generate synthetic data from sensitive data that human users cannot access). During training, brittle models may converge to a sub-optimal state and/or may converge slowly. For example, a model may converge to a model accuracy that is too low. In some cases, brittle models may fail to converge during training (e.g., the model may oscillate between two model states at each training step). Brittle models may need to be retrained to each newly received dataset. In many cases, it may not be apparent whether a model is brittle, without time consuming and costly training efforts.

Therefore, in view of the shortcomings and problems with conventional approaches to training models, there is a need for rapid, low-cost, unconventional systems that identify problems with model performance, including model brittleness, and improve model performance.

SUMMARY

The disclosed embodiments provide unconventional methods and systems for generating a model by identifying and improving problems with model performance, including model brittleness. The disclosed systems and methods may be implemented using a combination of conventional hardware and software as well as specialized hardware and software, such as a machine constructed and/or programmed specifically for performing functions associated with the disclosed method steps.

Consistent with the present embodiments, a system for generating a model is disclosed. The system may include one or more memory units storing instructions and one or more processors configured to execute the instructions to perform operations. The operations may include receiving a modeling request comprising a preliminary model and a dataset. The operations may include determining a preliminary brittleness score of the preliminary model. The operations may include identifying a reference model and determining a reference brittleness score of the reference model. The operations may involve comparing the preliminary brittleness score to the reference brittleness score and generating a preferred model based on the comparison. The operations may include providing the optimized model.

Consistent with the present embodiments, a method for generating a model is disclosed. The method may include receiving a modeling request comprising a preliminary model and a dataset. The method may include determining a preliminary brittleness score of the preliminary model. The method may include identifying a reference model and determining a reference brittleness score of the reference model. The method may include comparing the preliminary brittleness score to the reference brittleness score and generating a preferred model based on the comparison. The method may include providing the optimized model.

Consistent with other disclosed embodiments, non-transitory computer readable storage media may store program instructions, which are executed by at least one processor device and perform any of the methods described herein.

The foregoing general description and the following detailed description are exemplary and explanatory only and are not restrictive of the claims.

BRIEF DESCRIPTION OF THE DRAWINGS

The accompanying drawings, which are incorporated in and constitute a part of this specification, illustrate several embodiments and, together with the description, serve to explain the disclosed principles. In the drawings.

DESCRIPTION OF THE EMBODIMENTS

Figure 1:
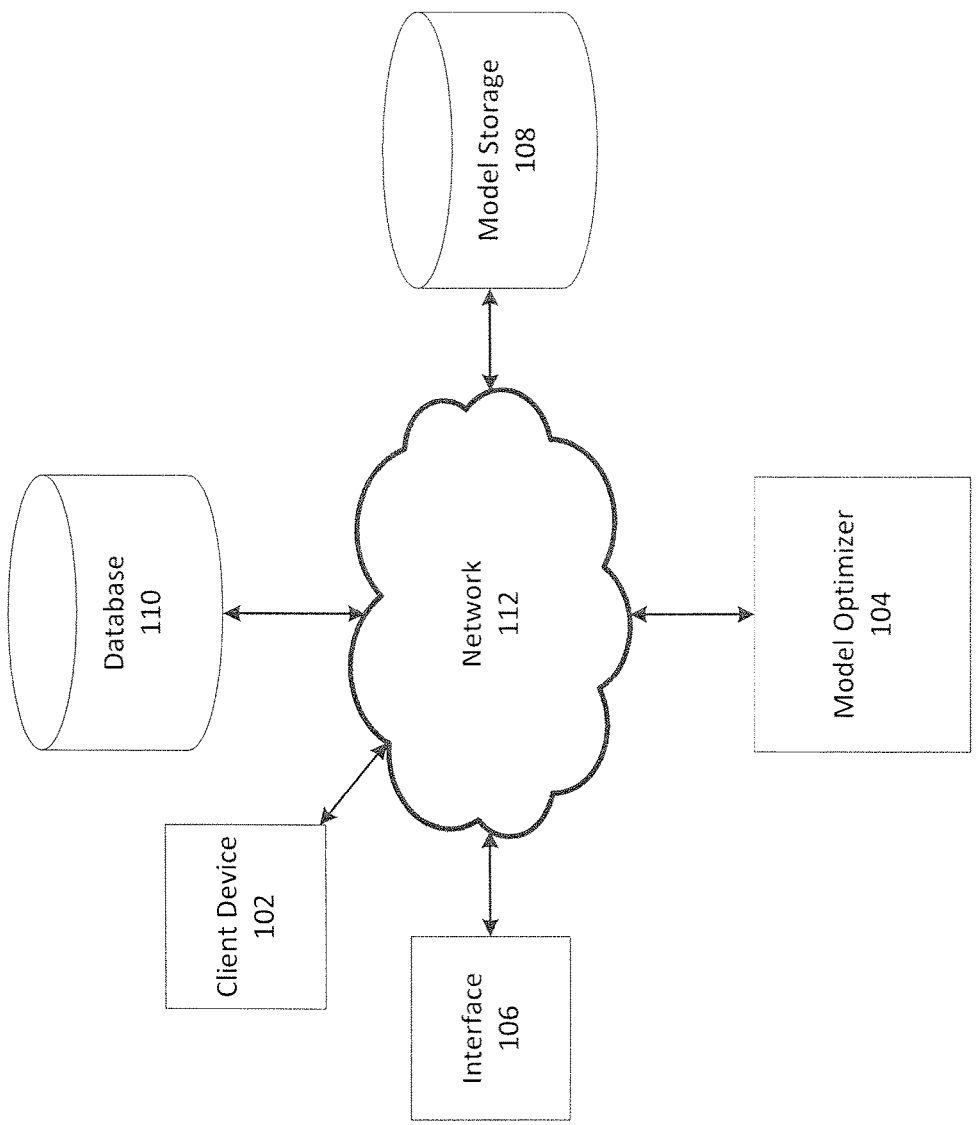
FIG. 1 is a diagram of an exemplary system to train models, consistent with disclosed embodiments.

The disclosed embodiments may involve generating and/or training models, including machine-learning models. The models may be preferred models which outperform a candidate or preliminary model according to a performance measure, including model brittleness and/or model accuracy. Disclosed embodiments improve model training and model generation by identifying and improving problems with model performance, including model brittleness. To achieve these improvements in model generation, disclosed embodiments include one or more memory units for storing instructions and one or more processors configured to execute the instructions to perform operations. The embodiments provide unconventional systems and methods for connecting datasets, clustering models, and training models using model seeds and data samples. In some embodiments, models are trained on a plurality of seeds and terminated when a training criterion is satisfied before fully training the model to meet a particular accuracy. For example, training may terminate when a learning rate threshold is met, a training-time threshold is met, and/or a number of epochs are complete. Accordingly, the embodiments may improve training efficiency and model performance by rapidly identifying and implementing changes to model parameter and hyperparameters.

Systems and methods of disclosed embodiments may involve datasets comprising actual data reflecting real-world conditions, events, or measurement. However, in some embodiments, disclosed systems and methods may fully or partially involve synthetic data (e.g., anonymized actual data or fake data). Datasets of disclosed embodiments may have a respective data schema (i.e, structure), including a data type, key-value pair, label, metadata, field, relationship, view, index, package, procedure, function, trigger, sequence, synonym, link, directory, queue, or the like. Datasets of the embodiments may contain foreign keys, i.e. data elements that appear in multiple datasets and may be used to cross-reference data and determine relationships between datasets. Foreign keys may be unique (e.g., a personal identifier) or shared (e.g., a postal code). Datasets of the embodiments may be "clustered," i.e., a group of datasets may share common features, such as overlapping data, shared statistical properties, etc. Clustered datasets may share hierarchical relationships (i.e., data lineage).

The disclosed embodiments may involve automatically indexing and clustering data models, including models of different types. Using generalized representations of the models, which may comprise neural networks, the disclosed embodiments can produce indices using comparable hyperparameters and cluster the models using those hyperparameters. In some aspects, the models may process unstructured data, such as one or more JSON (JavaScript Object Notation) files, one or more delimited files (e.g., comma-separated value (CSV) files), or the like into structured data, such as one or more relational data structures (e.g., tabular data or the like), one or more graphical data structures, or the like. In various embodiments, the disclosed systems may use the clusters to suggest models to users that are related to queries from the users.

Reference will now be made in detail to exemplary embodiments, examples of which are illustrated in the accompanying drawings and disclosed herein. Wherever convenient, the same reference numbers will be used throughout the drawings to refer to the same or like parts. The disclosed embodiments are described in sufficient detail to enable those skilled in the art to practice the disclosed embodiments. It is to be understood that other embodiments may be utilized and that changes may be made without departing from the scope of the disclosed embodiments. Thus, the materials, methods, and examples are illustrative only and are not intended to be necessarily limiting.

FIG. 1 is a diagram of exemplary system 100 to train models, consistent with disclosed embodiments. As shown, system 100 may include a client device 102, a model optimizer 104, an interface 106, a model storage 108, and a database 110. Components of system 100 may be connected to each other through a network 112.

In some embodiments, aspects of system 100 may be implemented on one or more cloud services designed to generate ("spin-up") one or more ephemeral container instances in response to event triggers, assign one or more tasks to a container instance, and terminate ("spin-down") a container instance upon completion of a task. By implementing methods using cloud services, disclosed systems efficiently provision resources based on demand and provide security advantages because the ephemeral container instances may be closed and destroyed upon completion of a task. That is, the container instances do not permit access from outside using terminals or remote shell tools like SSH, RTP, FTP, or CURL, for example. Further, terminating container instances may include destroying data, thereby protecting sensitive data. Destroying data can provide security advantages because it may involve permanently deleting data (e.g., overwriting data) and associated file pointers.

As will be appreciated by one skilled in the art, the components of system 100 can be arranged in various ways and implemented with any suitable combination of hardware, firmware, and/or software, as applicable. For example, as compared to the depiction in FIG. 1, system 100 may include a larger or smaller number of client devices, interfaces, model optimizers, model storages, and databases. In addition, system 100 may further include other components or devices not depicted that perform or assist in the performance of one or more processes, consistent with the disclosed embodiments. The exemplary components and arrangements shown in FIG. 1 are not intended to limit the disclosed embodiments.

Client device 102 may include one or more memory units and one or more processors configured to perform operations consistent with disclosed embodiments. In some embodiments, client device 102 may include hardware, software, and/or firmware modules. Client device 102 may be a terminal, a kiosk, a mobile device, a tablet, a personal computer, a server, a server cluster, a cloud service, a storage device, or a specialized device configured to perform methods according to disclosed embodiments, or the like.

System 100 may include model optimizer 104. Model optimizer 104 can include one or more computing systems configured to manage training of models for system 100, consistent with disclosed embodiments. Model optimizer 104 can be configured to receive models and/or datasets from other components of system 100 or other components not shown (e.g., via interface 106). Model optimizer 104 may be configured to train models. Model optimizer 104 may be configured to generate models and/or corresponding generalized representations. In some embodiments, model optimizer 104 is configured to export models to other components of system 100 and/or to external systems or devices.

Model optimizer 104 can be configured to generate models based on instructions received from a user or another system (e.g., via interface 106). For example, model optimizer 104 can be configured to receive a visual (graphical) depiction of a machine learning model and parse that graphical depiction into instructions for creating and training a corresponding neural network. Model optimizer 104 can be configured to select model training hyperparameters. This selection can be based on model performance feedback produced by model optimizer 104 during model training and/or received from another component of system 100. Model optimizer 104 can be configured to provide trained models and descriptive information concerning the trained models to model storage 106.

Model optimizer 104 may be configured to train machine learning models by optimizing model parameters and/or hyperparameters (hyperparameter tuning) using an optimization technique, consistent with disclosed embodiments. The optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. Tuning a hyperparameter may include iteratively selecting a hyperparameter and training model parameters using the hyperparameter until a training criterion is satisfied, consistent with disclosed embodiments. Model optimizer 104 is disclosed in greater detail, below (in reference to FIG. 2).

Interface 106 can be configured to manage interactions between system 100 and other systems using network 112. In some aspects, interface 106 can be configured to publish data received from other components of system 100. This data can be published in a publication and subscription framework (e.g., using APACHE KAFKA), through a network socket, in response to queries from other systems, or using other known methods. The data can be synthetic data, as described herein. As an additional example, interface 106 can be configured to provide information received from model storage 108 regarding available datasets. In various aspects, interface 106 can be configured to provide data or instructions received from other systems to components of system 100. For example, interface 106 can be configured to receive instructions for generating data models (e.g., type of data model, data model parameters, training data indicators, training hyperparameters, or the like) from another system and provide this information to model optimizer 104. As an additional example, interface 106 can be configured to receive data including sensitive portions from another system (e.g., in a file, a message in a publication and subscription framework, a network socket, or the like) and provide that components of system 100.

System 100 may include model storage 108. In some embodiments, some or all components of model storage 108 may be hosted on one or more servers, one or more clusters of servers, or one or more cloud services. Model storage 108 may be connected to network 112 and may additionally be directly connected to model optimizer 104 (not shown). In some embodiments, model storage 108 is a component of model optimizer 104 or client device 102 (not shown).

Model storage 108 can include one or more databases configured to store data models (e.g., machine learning models or statistical models) and descriptive information of the data models. Model storage 108 can be configured to provide information regarding available data models to a user or another system. The databases can include cloud-based databases, cloud-based buckets, or on-premises databases. The information can include model information, such as the type and/or purpose of the model and any measures of classification error. Model storage 108 can include one or more databases configured to store indexed and clustered models for use by system 100. For example, model storage 108 may store models associated with generalized representations of those models (e.g., neural network architectures stored in TENSORFLOW or other standardized formats). The databases can include cloud-based databases (e.g., AMAZON WEB SERVICES S3 buckets) or on-premises databases.

Database 110 can include one or more databases configured to store data for use by system 100. The databases can include cloud-based databases (e.g., AMAZON WEB SERVICES S3 buckets) or on-premises databases. Database 110 can include one or more databases configured to store indexed and clustered models for use by system 100, as described above.

As shown in FIG. 1, at least one of a client device 102, a model optimizer 104, a model storage 106, a model optimizer 108, and a database 110 may connect to network 112. Network 112 may be a public network or private network and may include, for example, a wired or wireless network, including, without limitation, a Local Area Network, a Wide Area Network, a Metropolitan Area Network, an IEEE 1002.11 wireless network (e.g., "Wi-Fi"), a network of networks (e.g., the Internet), a land-line telephone network, or the like. Network 112 may be connected to other networks, not depicted, to connect the various system components to each other and/or to external systems or devices. In some embodiments, network 112 may be a secure network and require a password to access the network.

Figure 2:
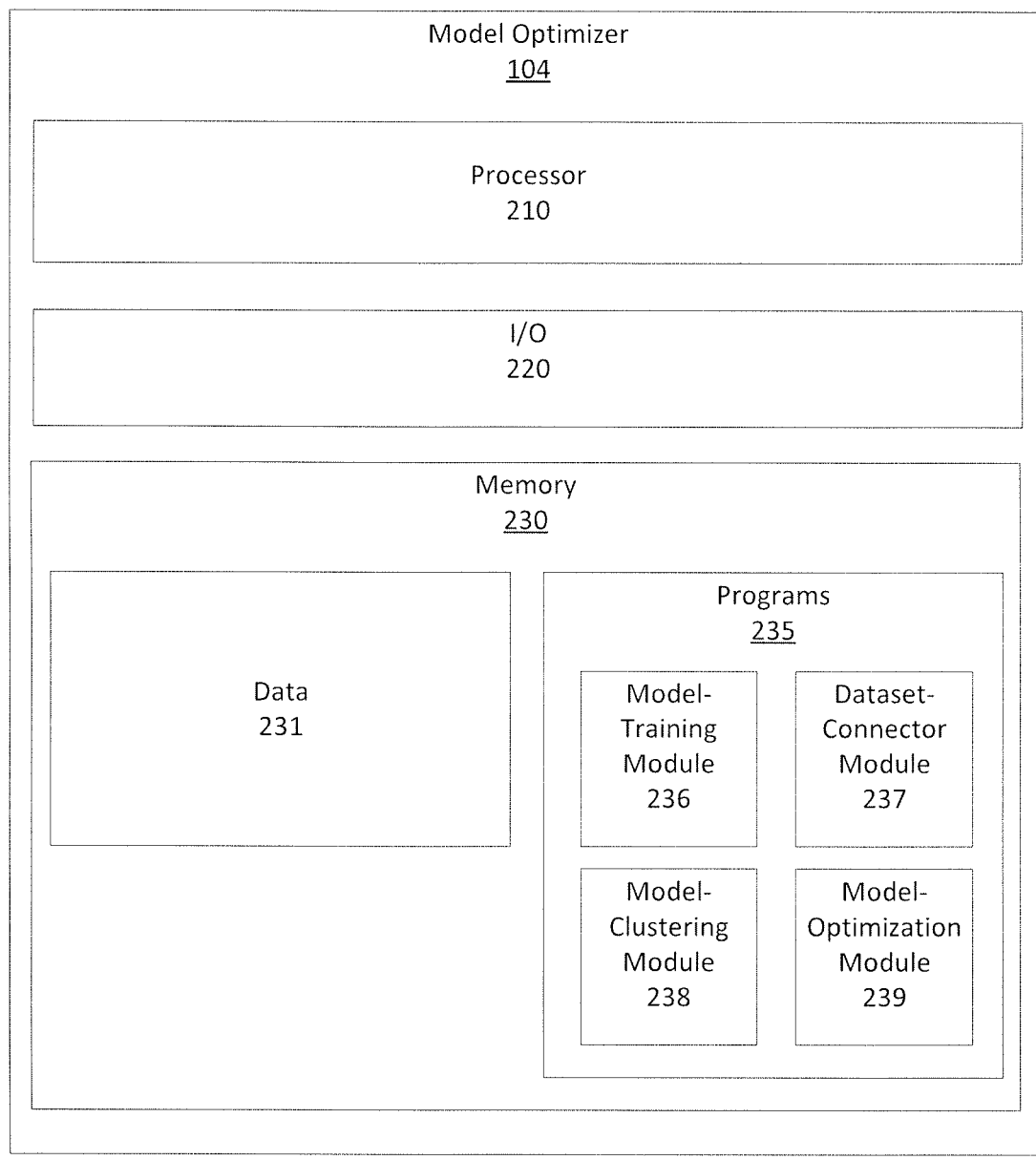
FIG. 2 is an illustration of an exemplary model optimizer, consistent with disclosed embodiments.

FIG. 2 is an illustration of an exemplary model optimizer, consistent with disclosed embodiments. As shown, model optimizer 104 includes one or more processors 210, one or more I/O devices 220, and one or more memory units 230. In some embodiments, some or all components of model optimizer 104 may be hosted on a device, a computer, a server, a cluster of servers, or a cloud service. In some embodiments, model optimizer 104 is a scalable system configured to efficiently manage resources and enhance security by provisioning computing resources in response to triggering events and terminating resources after completing a task (e.g., a scalable cloud service that spins up and terminates container instances).

As depicted in FIG. 2, model optimizer 104 may include one or more processors 210, input/output units (I/O devices) 220, and one or more memory units 230. FIG. 2 is an exemplary configuration of model optimizer 104. As will be appreciated by one skilled in the art, the components and arrangement of components included in model optimizer 104 may vary. For example, as compared to the depiction in FIG. 2, model optimizer 104 may include a larger or smaller number of processors 210, I/O devices 220, or memory units 230. In addition, model optimizer 104 may further include other components or devices not depicted that perform or assist in the performance of one or more processes consistent with the disclosed embodiments. The components and arrangements shown in FIG. 2 are not intended to limit the disclosed embodiments, as the components used to implement the disclosed processes and features may vary.

Processor 210 may be known computing processors, including a microprocessor. Processor 210 may constitute a single-core or multiple-core processor that executes parallel processes simultaneously. For example, processor 210 may be a single-core processor configured with virtual processing technologies. In some embodiments, processor 210 may use logical processors to simultaneously execute and control multiple processes. Processor 210 may implement virtual machine technologies, or other known technologies to provide the ability to execute, control, run, manipulate, store, etc., multiple software processes, applications, programs, etc. In another embodiment, processor 210 may include a multiple-core processor arrangement (e.g., dual core, quad core, etc.) configured to provide parallel processing functionalities to allow execution of multiple processes simultaneously. One of ordinary skill in the art would understand that other types of processor arrangements could be implemented that provide for the capabilities disclosed herein. The disclosed embodiments are not limited to any type of processor(s) 210. Processor 210 may execute various instructions stored in memory 230 to perform various functions of the disclosed embodiments described in greater detail below. Processor 210 is configured to execute functions written in one or more known programming languages.

I/O devices 220 may include at least one of a display, an LED, a router, a touchscreen, a keyboard, a microphone, a speaker, a haptic device, a camera, a button, a dial, a switch, a knob, a transceiver, an input device, an output device, or another I/O device to perform methods of the disclosed embodiments. I/O devices 220 may be components of an interface of model optimizer 104 (e.g., a user interface such as user interface 106).

Referring again to FIG. 2, memory 230 may be a volatile or non-volatile, magnetic, semiconductor, optical, removable, non-removable, or other type of storage device or tangible (i.e., non-transitory) computer-readable medium, consistent with disclosed embodiments. As shown, memory 230 may include data 231, including of at least one of encrypted data or unencrypted data. Data 231 may include one or more model indexes, model parameters, model hyperparameters, model codes, dataset indexes, and/or datasets, consistent with disclosed embodiments.

Programs 235 may include one or more programs (e.g., modules, code, scripts, or functions) used to perform methods consistent with disclosed embodiments. Programs may include operating systems (not shown) that perform known operating system functions when executed by one or more processors. Disclosed embodiments may operate and function with computer systems running any type of operating system. Programs 235 may be written in one or more programming or scripting languages. One or more of such software sections or modules of memory 230 can be integrated into a computer system, non-transitory computer-readable media, or existing communications software. Programs 235 can also be implemented or replicated as firmware or circuit logic.

Programs 235 may include a model-training module 236, a dataset-clustering module 237, a model-clustering module 238, a model-optimization module 239, and/or other modules not depicted to perform methods of the disclosed embodiments. In some embodiments, modules of programs 235 may be configured to generate ("spin up") one or more ephemeral container instances to perform a task and/or to assign a task to a running (warm) container instance, consistent with disclosed embodiments. Modules of programs 235 may be configured to receive, retrieve, and/or generate models, consistent with disclosed embodiments. Modules of programs 235 may be configured to receive, retrieve, and/or generate datasets (e.g., to generate synthetic datasets, data samples, or other datasets), consistent with disclosed embodiments. Modules of programs 235 may be configured to perform operations in coordination with one another. For example, model-optimization module 239 may send a model training request to model-training module 236 and receive a trained model in return, consistent with disclosed embodiments.

Model-training module 236 may be configured to train one or more models and/or perform hyperparameter tuning of one or more models, including machine learning models. For example, model-training module 236 can be configured to receive input of one or more thresholds, one or more loss functions, and/or one or more limits on a number of interactions and apply the input for optimizing a received model and/or corresponding generalized representation such as a neural network. In some embodiments, training of a model terminates when a training criterion is satisfied. In some embodiments, model-training module 236 is configured to adjust model parameters during training. The model parameters may include weights, coefficients, offsets, or the like. Training can be supervised or unsupervised.

Model-training module 236 can be configured to select or generate model parameters (e.g., number of layers for a neural network, kernel function for a kernel density estimator, or the like), update training hyperparameters, and evaluate model characteristics. For example, model characteristics may include a model type (e.g., recurrent neural network (RNN), convolutional neural network (CNN), random forest, or other model type), a model parameter, a model hyperparameter, a desired outcome, belongingness to a model cluster, and/or belongingness of a model training dataset to a dataset cluster, the similarity of synthetic data generated by a model to actual data, or other characteristics.

Model-training module 236 may be configured to generate one or more "seeds" (i.e., starting positions for model training) comprising model parameters. The seeds may be based on an instruction to generate a random parameter seed, to generate a grid of parameter seeds, to generate a predetermined number of parameter seeds, or the like. The seeds may be based on a previously trained version of a model and/or on a similar model. In some embodiments, model optimizer 104 can be configured to provision computing resources with an initialized data model for training. For example, the initialized data model can be, or can be based upon, a model retrieved from model storage 108 or a model received via interface 106.

In some embodiments, model-training module 236 is configured to perform a search of a hyperparameter space and select new hyperparameters. This search may or may not depend on the values of a performance metric obtained for other trained models. In some aspects, model-training module 236 can be configured to perform a grid search or a random search. The hyperparameters can include training hyperparameters, which can affect how training of the model occurs, or architectural hyperparameters, which can affect the structure of the model.

Consistent with disclosed embodiments, hyperparameters can include training hyperparameters such as learning rate, batch size, number of training batches, number of epochs, chunk size, time window, input noise dimension, or the like. Hyperparameters can include architectural parameters such as number of layers in a neural network, the choice of activation function for a neural network node, the layers in a CNN or the like. For example, when the stored model comprises a generative adversarial network (GAN), training hyperparameters for the model can include a weight for a loss function penalty term that penalizes the generation of training data according to a similarity metric. As a further example, when the stored model comprises a neural network, the training hyperparameters can include a learning rate for the neural network. As an additional example, when the model is a CNN, architectural hyperparameters can include the number and type of layers in the convolutional neural network.

In some embodiments, model-training module 236 includes programs to apply one or more templates to a data model (e.g., a model retrieved from model storage 108) and apply the templates to generate a generalized representation of the retrieved model (e.g., a neural network). Model-training module 236 may include programs to provide trained generalized representations to model storage 108 for storing in association with corresponding models.

Dataset clustering module 237 may be configured to cluster datasets, consistent with disclosed embodiments. Dataset-clustering module 237 may include or be configured to implement one or more data-profiling models. A data-profiling model may include machine learning models and statistical models to determine the data schema and/or a statistical profile of a dataset (i.e., to profile a dataset), consistent with disclosed embodiments. The data-profiling model may include a GAN network model, an RNN model, a CNN model, or other machine learning model. The data-profiling model may include algorithms to determine a data type, key-value pairs, row-column data structure, or other property of a data schema. The data-profiling model may be configured to implement univariate and multivariate statistical methods. The data-profiling model may include a regression model, a Bayesian model, a statistical model, a linear discriminant analysis model, or other classification model configured to determine one or more descriptive metrics of a dataset. For example, the data-profiling model may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

In some embodiments, the one or more data-profiling models may be configured to return a statistical profile of a dataset. The statistical profile may include a plurality of descriptive metrics. For example, the statistical profile may include an average, a mean, a standard deviation, a range, a moment, a variance, a covariance, a covariance matrix or any other statistical metric of the selected dataset. In some embodiments, the statistical metric may be a similarity metric representing a measure of similarity between data in a dataset. The similarity metric may be based on a covariance matrix, a variance, a frequency of overlapping values, or other measure of statistical similarity.

Dataset-clustering module 237 may be configured to generate a data-mapping model, implement a data-mapping model. A data-mapping model may include machine learning models to generate edges between nodes, the nodes being datasets (i.e., cluster datasets, data mapping or data crawling). The data-mapping model may include at least one of an RNN model, a CNN model, a random forest model, a bag-of-words model, a multilayer perceptron model, a gated recurrent unit model, a seq2seq model, or another machine learning model. An edge may comprise an indicator of a hierarchical relationship (e.g., a data lineage, parent-child relationship, derived data, an ambiguous hierarchy), and may include an overlap score indicating the amount of overlap between datasets.

In some embodiments, dataset-connector module 237 may be configured to generate or retrieve a data-mapping model from a data storage (e.g., model storage 108). Dataset-clustering module 237 may identify and retrieve a data-mapping model based on a statistical profile, a data schema, a model index, and/or a model search strategy. Consistent with disclosed embodiments, the search strategy may include a random search or a grid search. In some embodiments, dataset-connector module 237 may be configured to receive a plurality of datasets and retrieve a data-mapping model previously used to generate edge data for one of the received datasets. Dataset-clustering module 237 may be configured to retrieve a data mapping module previously used for a dataset that share features of a data schema of one of the received datasets. In some aspects, dataset-connector module 237 may be capable of retrieving a data-mapping model used for a dataset having a statistical similarity metric with one of the received datasets that meets a threshold criterion.

In some embodiments, the data-mapping model includes machine learning models or other models to identify foreign keys and maintain an index of foreign keys (e.g., a data crawler model). The foreign keys may be unique or shared, consistent with disclosed embodiments. The foreign keys may be stored in, for example, database 110 and/or data 231. The data-mapping model may be configured to predict foreign keys by identifying candidate foreign keys and determining a foreign key score based on at least one of an index of foreign keys or a search of a dataset. For example, the data-mapping model may be configured to determine a foreign key score based on a frequency of occurrence of a candidate foreign key in one or more datasets or based on a label associated with the candidate foreign key. As another example, the data-mapping model may be capable of assigning a foreign key score to a candidate foreign key based on its occurrence in a data column that includes known foreign keys.

The data-mapping model of dataset-connector module 237 may be configured to connect datasets (i.e., generate edges between datasets) based on at least one of a foreign key, a data schema, or a similarity metric. Edge data may include information indicating a similarity between datasets (e.g., a measure of data overlap, correlation, covariance, or other measure of statistical similarity) or a hierarchical relationship (e.g., derived data, parent-child relationships). The data-mapping model may be configured to receive a plurality of datasets and generate edges based solely on the received datasets. In some embodiments, the data-mapping model may be configured to receive a plurality of datasets and generate edges based on the received datasets and on stored, clustered datasets.

Dataset-clustering module 237 may include or be configured to implement a data classification model. The data classification model may include machine learning models to classify datasets based on the data schema, statistical profile, foreign keys, and/or edges. The data classification model may be configured to segment datasets, consistent with disclosed embodiments. Segmenting may include classifying some or all data within a dataset, marking or labeling data (e.g., as duplicate), cleaning a dataset, formatting a dataset, or eliminating some or all data within a dataset based on classification. The models may be configured to classify data elements as actual data, synthetic data, relevant data for an analysis goal or topic, data derived from another dataset, or any other data category. The data classification model may include a CNN, a random forest model, an RNN model, a support vector machine model, or another machine learning model.

Model-clustering module 238 may be configured to classify and/or cluster models consistent with disclosed embodiments. In some embodiments, classifying and/or clustering a model by model-clustering module 238 may be based on model functionality, a type of model, a desired model outcome, and/or datasets used for training a model. Model-clustering module 238 may include or be a component of a model curator, consistent with disclosed embodiments.

Model-clustering module 238 may be configured to transform received models into generalized representations. In an embodiment, transformations may include one or more blueprints for converting a decision tree to an equivalent neural network structure, a blueprint for converting a Bayesian classifier to an equivalent neural network structure, or the like. Additionally or alternatively, a grid search may map hyperparameters of each received model (e.g., a decision tree, a Bayesian classifier, or the like) to an equivalent neural network structure. In some embodiments, one or more hyperparameters may be added. For example, a least absolute shrinkage and selection operator (LASSO) algorithm may add a regularization hyperparameter to a model comprising an ordinary least squares regression such that the model is suitable for a grid search.

In some embodiments, model-clustering module 238 can be configured to classify and/or cluster models based on comparisons of hyperparameters of the models themselves and/or of their generalized representations. Additionally or alternatively, model-clustering module 238 can be configured to cluster models based on similarities (in hyperparameters or other structural variables, such as activation functions, number of weights, or the like) in structure of the models themselves and/or of their generalized representations.

Model-clustering module 238 may classify and/or cluster the generalized representations. Accordingly, model-clustering module 238 may apply one or more thresholds to one or more hyperparameters in order to classify the generalized representations into one or more clusters. Additionally or alternatively, model-clustering module 238 may apply hierarchical clustering, centroid-based clustering, distribution-based clustering, density-based clustering, or the like to the one or more hyperparameters. In any of the embodiments described above, model-clustering module 238 may perform fuzzy clustering such that each generalized representation has an associated score (such as 3 out of 5, 22.5 out of 100, a letter grade such as 'A' or 'C,' or the like) indicating a degree of belongingness in each cluster. In such embodiments, model-clustering module 238 may store the degrees of belongingness in model storage 108 and/or database 110 associated with the generalized representations.

In addition to or in lieu of the hyperparameters, model-clustering module 238 may compare structural similarities of the generalized representations to perform the clustering. For example, model-clustering module 238 may cluster the generalized representations based on a type of activation function used in one or more nodes of a neural network such that one cluster is for polynomials (with possible sub-clusters based on order), another cluster is for logistic functions, or the like. In another example, model-clustering module 238 may cluster the generalized representations based on ranges of one or more weights associated with one or more nodes of the neural network.

Model-optimization module 239 may include algorithms to determine model performance (e.g., a model performance score). Accordingly, model-optimization module 239 may perform operations in cooperation with other modules of model optimizer 104, including model-training module 236, dataset-connector module 237, and/or model-clustering module 238. The model performance may include a brittleness score, an accuracy score, a training time score, or another model performance score.

For example, model-optimization module 239 may be configured to generate a plurality of data samples of a dataset and generate a plurality of seeds and train a model using the data samples and the seeds, consistent with disclosed embodiments. The performance score may include a descriptive statistic of training outcomes from model training performed on the seeds and data samples. For example, the brittleness score may be based on the percent of training runs that reach a converge outcome describing whether a model reaches a state that satisfies one or more training criterions. For example, a convergence outcome may indicate whether the model has stopped learning (e.g., the loss function falls below a threshold) or continues to generate new parameter values. In some embodiments, the convergence outcome may indicate that the model fails to converge (e.g., oscillates between one or more parameter states at each training step). A convergence outcome may be associated with an accuracy score and/or a training time score. An accuracy score may represent a statistical description of how well model data matches training data upon satisfaction of training criteria. A model training time score may represent a statistical description of how quickly a model converges to satisfy training criteria.

In some embodiments, the performance score may include a descriptive statistic of hyperparameter tuning outcomes from hyperparameter tuning performed on a fixed training hyperparameter. For example, the brittleness score may be based on a variance of architectural hyperparameters. A high variance in an architectural hyperparameter associated with high accuracy after model training may indicate a good brittleness score. In some cases, a high variance in which only a few architectural hyperparameters achieve high accuracy after model training may indicate a poor brittleness score.

Model-optimization module 239 may be configured to relate model performance to model characteristics and to maintain information associated with the relationships. For example, model-optimization module 239 may store and/or retrieve model performance data in data 231, model storage 108, database 110, and/or another data storage.

Figure 3:
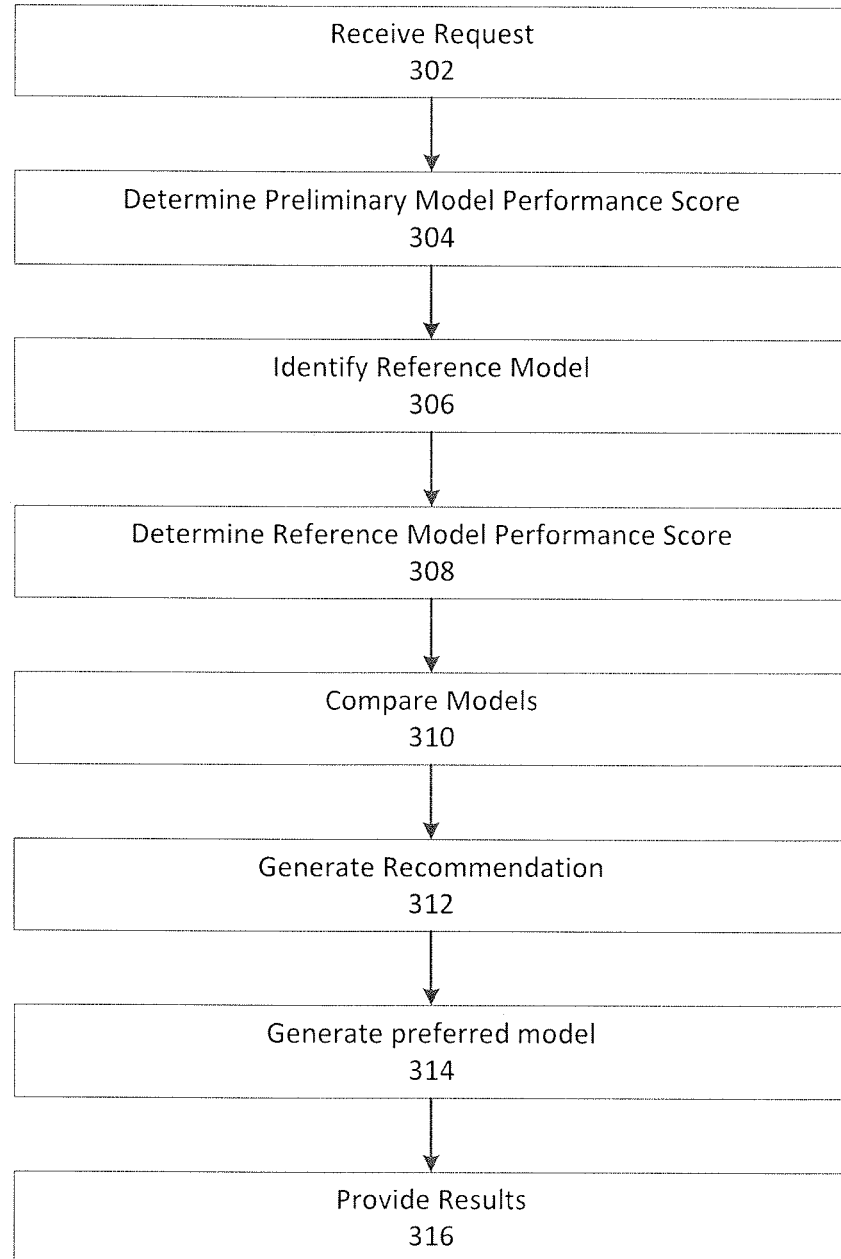
FIG. 3 depicts an exemplary process for improving model performance, consistent with disclosed embodiments.

FIG. 3 is an illustration of exemplary process 300 for improving model performance, consistent with disclosed embodiments. In some embodiments, model optimizer 104 performs process 300. One or more of model-training module 236, dataset-connector module 237, model-clustering module 238, or model-optimization module 239 may perform operations of process 300, consistent with disclosed embodiments. It should be noted that other components of system 100, including, for example, client device 102 may perform one or more steps of process 300.

Consistent with disclosed embodiments, steps of process 300 may be performed on one or more cloud services using one or more ephemeral container instances. For example, at any of the steps of process 300, model optimizer 104 may generate (spin up) an ephemeral container instance to execute a task, assign a task to an already-running ephemeral container instance (warm container instance), or terminate a container instance upon completion of a task. As one of skill in the art will appreciate, steps of process 300 may be performed as part of an application interface (API) call.

At step 302, model optimizer 104 receives a modeling request, consistent with disclosed embodiments. The request may be received from, for example, client device 102 and/or via interface 106. The request may include a preliminary model and/or a dataset. In some embodiments, the preliminary model is a machine learning model. The request may include a reference model, consistent with disclosed embodiments. The dataset may include real (actual) data and/or synthetic data, consistent with disclosed embodiments. In some embodiments, the request includes instructions to generate a model and may include model parameters, hyperparameters, or other model characteristics. In some embodiments, the request includes instructions to retrieve a model and/or a dataset from a data storage (e.g., data 231, model storage 108, and/or database 110). The request may include instructions to generate or retrieve a model based on a desired outcome and a dataset (or a dataset cluster or other dataset characteristic), consistent with disclosed embodiments. The request may include one or more parameter seed properties. For example, the request may include an instruction to generate a random parameter seed, to generate a grid of parameter seeds, to generate a predetermined number of parameter seeds, or the like.

At step 304, model optimizer 104 determines one or more preliminary model performance scores, consistent with disclosed embodiments. A performance score may include one of a brittleness score, an accuracy score, a training time score, or other performance score. Determining a model performance score may include generating a plurality of parameter seeds and generating a plurality of data samples of the dataset. The parameter seeds may be generated based on a received instruction that includes a property of the parameter seed. Determining a model performance score may include model training and generating a plurality of training outcomes of the preliminary model, based on the parameter seeds and data samples. The training outcomes may include a convergence outcome, an accuracy outcome, and/or a training time outcome. In some embodiments, step 304 includes process 400 and/or process 700, described in greater detail below. Determining a reference preliminary model performance score may include retrieving the performance score from a data storage.

At step 306, model optimizer 104 identifies one or more reference models, consistent with disclosed embodiments. In some embodiments, identifying a reference model includes retrieving a model from a data storage (e.g., data 231, model storage 108, and/or database 110). In some embodiments, the reference model may be a reference model received at step 302.

Identifying a reference model may include identifying one or more candidate reference models and selecting a candidate reference model based on selection criteria. The selection criteria may be based on determining whether a candidate reference model and the preliminary model belong to a model cluster, consistent with disclosed embodiments. The selection criteria may be based on a comparison the structure of the preliminary model and a candidate reference model themselves and/or of their generalized representations. The selection criteria may also be based on a measure of model similarity. In some embodiments, identifying a reference model may be based on an instruction received as part of the modeling request of step 302. The instruction may include an instruction to identify the reference model based on a matching criterion for a model similarity between the reference model and the preliminary model.

In some embodiments, identifying a reference model includes identifying a reference dataset and identifying the reference model based on the reference dataset. For example, identifying a reference dataset may be based on a similarity metric between the reference dataset and the received (or retrieved) dataset (step 302). In some embodiments, identifying the reference model includes identifying a candidate reference model that was previously trained on the reference dataset. In some embodiments, identifying a reference dataset may be based on a received instruction (e.g., an instruction received at step 302). The instruction may specify matching criteria for a similarity metric between the reference dataset and the received (or retrieved) dataset.

At step 308, model optimizer 104 determines a reference model performance score, consistent with disclosed embodiments. In some embodiments, determining a reference model performance score includes retrieving the performance score from a data storage. In some embodiments, step 308 includes process 400 and/or process 700, described in greater detail below.

At step 310, model optimizer 104 compares the reference model to the preliminary model, consistent with disclosed embodiments. Comparing the reference model to the preliminary model may include comparing a reference model performance score to a preliminary model performance score. For example, step 310 may include comparing brittleness scores, accuracy scores, and/or training time scores. In some embodiments, comparing models at step 310 may include comparing a performance score to a threshold performance score. Comparing models at step 310 may include comparing model type, desired outcome, training datasets used by the models, and/or comparing other model characteristics, consistent with disclosed embodiments.

For example, based on the comparison, model optimizer 104 may determine that the reference model outperforms the preliminary model based on the comparison and that reference model and preliminary model have a different model characteristic. As an illustrative example, model optimizer 104 may determine that the reference model brittleness score satisfies a performance criterion (e.g., a threshold criterion) but the preliminary model brittleness score does not satisfy the criterion, and that the reference model includes three neural network layers while the preliminary model has ten neural network layers. Step 310 may include comparing a performance score to a threshold performance score.

In some embodiments, step 310 may include determining a relationship between a preliminary and/or reference model performance score and a preliminary and/or reference model characteristic. For example, model optimizer 104 may use a model-assessment model (e.g., a machine learning model or a statistical model) to associate changes in model characteristics with changes in performance scores. For example, step 310 may include identifying changes in a performance score that correspond to changes in a hyperparameter value during model training (e.g., it may be determined that brittleness scores and accuracy scores of a model increase as the number of neural network layers increase).

At step 312, model optimizer 104 generates a recommendation, consistent with disclosed embodiments. The recommendation may be based on the comparison and/or training history. Model optimizer 104 may generate a recommendation to change a model characteristic. For example, model optimizer 104 may recommend changing the value of a hyperparameter of the preliminary model or the reference model. The recommendation may be based on performance criteria and a relationship between the performance criterion and the model characteristic.

At step 314, model optimizer 104 generates a preferred model, consistent with disclosed embodiments. The preferred model may be based on the recommendation (step 312). In some embodiments, the preferred model may be the preliminary model or may be based on the preliminary model. The preferred model may be the reference model or may be based on the reference model. Generating a preferred model may include training the preferred model and/or setting a hyperparameter of the preferred model.

At step 316, model optimizer 104 provides results, consistent with disclosed embodiments. Providing results may include storing results in a data storage, transmitting results to another component of system 100, and/or transmitting results to systems or devices external to system 100 (e.g., via interface 106). Providing results may include presenting results by a display, playing a notification, or the like (e.g., via I/O devices 220 and/or interface 106). The results may include the recommendation and/or the preferred model. The results may include providing model training information of the preliminary model and/or the reference model (e.g., parameter values, hyperparameters values, performance scores, training time, training outcomes, parameter seed values, hyperparameter values, information associated with a relationship between a model characteristic and a performance score, or the like).

It should be noted that process 300 may be performed iteratively. That is, following one of steps 314 and/or 316, model optimizer 104 may receive an updated training request involving the dataset, the preliminary model, the preferred model, and/or the reference model and repeat some or all of steps 302-316.

Figure 4:
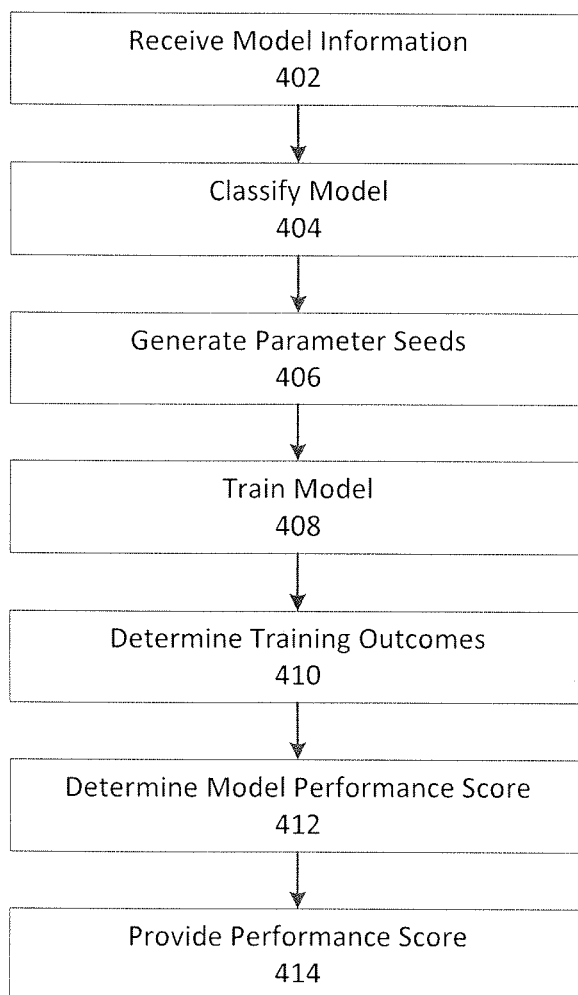
FIG. 4 depicts an exemplary process for determining model performance, consistent with disclosed embodiments.

FIG. 4 is a diagram of exemplary process 400 for determining model performance, consistent with disclosed embodiments. In some embodiments, model optimizer 104 performs process 400. One or more of model-training module 236, dataset-connector module 237, model-clustering module 238, or model-optimization module 239 may perform operations of process 400, consistent with disclosed embodiments. It should be noted that other components of system 100, including, for example, client device 102 may perform one or more steps of process 400.

Consistent with disclosed embodiments, steps of process 400 may be performed on one or more cloud services using one or more ephemeral container instances. For example, at any of the steps of process 400, model optimizer 104 may generate (spin up) an ephemeral container instance to execute a task, assign a task to an already-running ephemeral container instance ("warm container instance"), or terminate a container instance upon completion of a task. As one of skill in the art will appreciate, steps of process 400 may be performed as part of an API call.

At step 402, model optimizer 104 receives model information, consistent with disclosed embodiments. The information may be received from, for example, client device 102 and/or via interface 106. The information may include a model and/or a dataset. In some embodiments, the model is a machine learning model. The dataset may include real (actual) data and/or synthetic data, consistent with disclosed embodiments. In some embodiments, the information includes instructions to generate a model and may include model parameters, hyperparameters, or other model characteristics. In some embodiments, the information includes instructions to retrieve a model and/or a dataset from a data storage (e.g., data 231, model storage 108, and/or database 110). The information may include instructions to generate or retrieve a model based on a desired outcome and a dataset (or a dataset cluster or other dataset characteristic), consistent with disclosed embodiments. The information may include one or more parameter seed properties (e.g., an instruction to generate a random parameter seed, to generate a grid of parameter seeds, to generate a predetermined number of parameter seeds, or the like).

At step 404, model optimizer 104 classifies the model, consistent with disclosed embodiments. Classifying the model may include determining a model characteristic and/or determining that a model belongs to a cluster, consistent with disclosed embodiments. In some embodiments, the model may be classified based on a training dataset used to train the model.

At step 406, model optimizer 104 generates one or more parameter seeds, consistent with disclosed embodiments. For example, the parameter seeds may be generated randomly, generated according to a grid, generated based on a predetermined number of parameter seeds, or the like. The parameter seeds include one or more model parameter values (e.g., weights, coefficients, offsets, or the like). Generating a random seed may be based on a received information received at step 402.

At step 408, model optimizer 104 trains the model using the parameter seeds and the received (or retrieved) dataset, consistent with disclosed embodiments. In some embodiments, step 408 includes generating a series of data samples based on the dataset. For example, model optimizer 104 may execute a training run for one or more combinations of data samples and parameter seeds. A model training run may terminate upon satisfaction of a training criterion, consistent with disclosed embodiments. It should be noted that the training criterion of step 408 may not require training the model until it achieves a particular accuracy. For example, in some embodiments, the training criterion of step 408 may include a learning rate threshold, a training-time threshold, and/or a number of epochs completed (e.g., one or two epochs). Model training may be based on a training hyperparameter. The training hyperparameter may be received from another component of system 100, from systems or devices external to system 100, and/or retrieved from a data storage (e.g., at step 402).

At step 410, model optimizer 104 determines one or more training outcomes, consistent with disclosed embodiments. For example, model optimizer 104 may determine a training outcome associated with one or more training runs. The training outcomes may include a convergence outcome, an accuracy outcome, and/or a training time outcome.

At step 412, model optimizer 104 determines one or more training model performance scores based on the one or more training outcomes consistent with disclosed embodiments. A performance score may include a brittleness score, an accuracy score, and/or a training time score.

At step 414, model optimizer 104 provides one or more model performance scores, consistent with disclosed embodiments. Providing a performance score may include storing the performance score in a data storage, transmitting the performance score to another component of system 100, and/or transmitting the performance score to systems or devices external to system 100 (e.g., via interface 106). Providing a performance score may include presenting the performance score by a display, playing a notification, or the like (e.g., via I/O devices 220 and/or interface 106).

Figure 5:
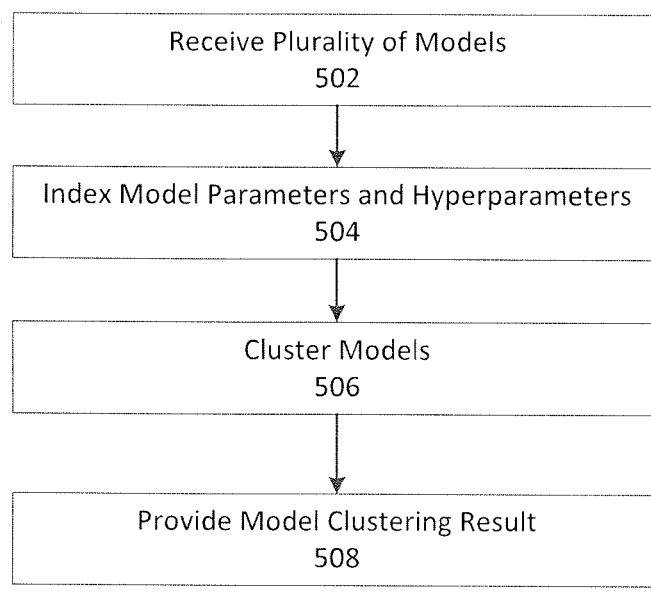
FIG. 5 depicts an exemplary process for clustering models, consistent with disclosed embodiments.

FIG. 5 depicts exemplary process 500 for clustering models, consistent with disclosed embodiments. In some embodiments, model optimizer 104 performs process 500. One or more of model-training module 236, dataset-connector module 237, model-clustering module 238, and/or model-optimization module 239 may perform operations of process 500, consistent with disclosed embodiments. It should be noted that other components of system 100, including, for example, client device 102 may perform one or more steps of process 500.

Consistent with disclosed embodiments, steps of process 500 may be performed on one or more cloud services using one or more ephemeral container instances. For example, at any of the steps of process 500, model optimizer 104 may generate (spin up) an ephemeral container instance to execute a task, assign a task to an already-running ephemeral container instance (warm container instance), or terminate a container instance upon completion of a task. As one of skill in the art will appreciate, steps of process 500 may be performed as part of an API call.

At step 502, model optimizer 104 receives a plurality of models, consistent with disclosed embodiments. As explained above, the received models may comprise machine learned models. For example, the received models may comprise at least one random forest model, at least one neural network, at least one regression model, or the like. The models may be configured to generate structured data from unstructured data, as described above.

At step 504, model optimizer 104 indexes the model parameters and hyperparameters, consistent with disclosed embodiments. Step 504 may include using one or more templates to generalize one of more of the models into one or more corresponding neural network architectures. For example, the templates may comprise mappings of model types to corresponding neural network architectures. The corresponding neural network architectures may include a number of layers, a number of nodes in each layer, and connections between the nodes. In some embodiments, the corresponding neural network architectures may further include at least one of activation functions for the nodes or a number of weights associated with each node. In some embodiments, step 504 includes training a generalized model using the same training and/or testing data used to train the received model.

At step 506, model optimizer 104 clusters models, consistent with disclosed embodiments. For example, model optimizer 104 may map the hyperparameters of the one or more generalized models. The hyperparameters may be directly extracted from a representation of the generalized model (e.g., a number of layers, a number of nodes, or the like) or may be extracted from a file describing a neural network such as a TENSORFLOW file. Additionally or alternatively, the hyperparameters may be determined during a training of the generalized model, as described above. For example, the processor may determine a learning rate during training of the generalized model.

In some embodiments, step 506 may include generating a relational index such that generalized representations are retrievable using the hyperparameters. In some embodiments, model optimizer 104 may generate a graphical index such that each generalized representation is a node and is connected, via an edge, to one or more nodes representing the hyperparameters.

In addition, model optimizer 104 may cluster the indexed models using the hyperparameters and/or the templates. For example, the clustering may include applying one or more thresholds to one or more of the hyperparameters to generate one or more clusters. Additionally or alternatively, the clustering may comprise at least one of hierarchical clustering, centroid-based clustering, distribution-based clustering, or density-based clustering.

In some embodiments, the clustering may comprise fuzzy clustering such that each generalized model has a score associated with a degree of belonging in each cluster generated by the clustering. In such embodiments, the processor may store representations of the corresponding generalized models in association with each degree of belonging.

At step 508, model optimizer 104 provides one or more model clustering results, consistent with disclosed embodiments. A model clustering result may include a label, metadata, a classification, or other information indicating whether a model belongs to a category or cluster, consistent with disclosed embodiments. A model clustering result may include one or more generalized models and/or other models. Step 508 may include transmitting a clustering result to another component of system 100, to systems or devices external to system 100 (e.g., via interface 106). Step 508 may include providing a model clustering result to a model as part of a process (e.g., process 300, process 400). Providing a model clustering result may include storing the result in a data storage, consistent with disclosed embodiments.

Figure 6:
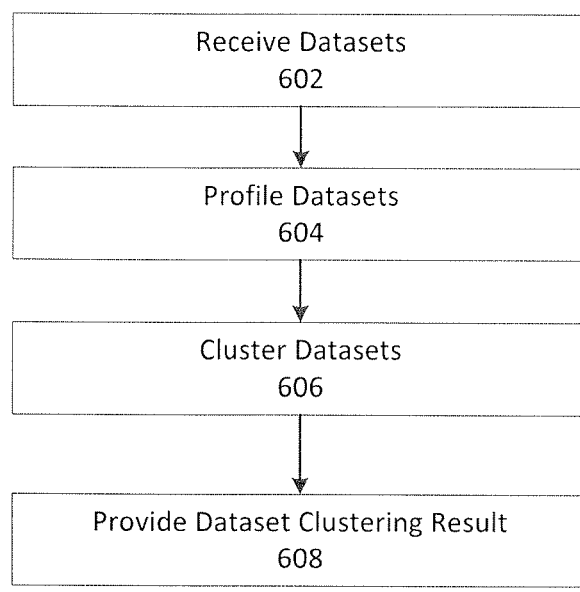
FIG. 6 depicts an exemplary process for clustering datasets, consistent with disclosed embodiments.

FIG. 6 depicts exemplary process 600 for clustering datasets, consistent with disclosed embodiments. In some embodiments, model optimizer 104 performs process 600. One or more of model-training module 236, dataset-connector module 237, model-clustering module 238, or model-optimization module 239 may perform operations of process 600, consistent with disclosed embodiments. It should be noted that other components of system 100, including, for example, client device 102 may perform one or more steps of process 600.

Consistent with disclosed embodiments, steps of process 600 may be performed on one or more cloud services using one or more ephemeral container instances. For example, at any of the steps of process 600, model optimizer 104 may generate (spin up) an ephemeral container instance to execute a task, assign a task to an already-running ephemeral container instance (warm container instance), or terminate a container instance upon completion of a task. As one of skill in the art will appreciate, steps of process 600 may be performed as part of an API call.

At step 602, model optimizer 104 receives a plurality of datasets, consistent with disclosed embodiments. For example, model optimizer 104 may receive datasets from at least one of client device 102, data 231, database 110, another component of system 100, or another remote device. Step 602 may be a triggering event that causes model optimizer 104 to generate an ephemeral container instance to perform other steps of process 600. Step 602 may include receiving a dataset index, a data label, a foreign key, or a foreign key index. The label may indicate whether one or more data elements are actual data, synthetic data, relevant data, or another category of data. The dataset index may include metadata, an indicator of whether data element is actual data or synthetic data, a data schema, a statistical profile, a data label, a relationship between datasets (e.g., node and edge data), or other descriptive information.

At step 604, model optimizer 104 profiles one or more of the received datasets, consistent with disclosed embodiments. Profiling a dataset may include identifying a data schema of the dataset; determining a statistical metric of the dataset; or retrieving, storing, and/or training a model (e.g., a data-profiling model).

At step 606, model optimizer 104 clusters the datasets, consistent with disclosed embodiments. Clustering the datasets may include identifying foreign keys and/or determining foreign key scores associated with the data. In some embodiments, clustering the datasets may include implementing a data-mapping model or generating a plurality of edges between datasets based on the foreign key scores, the data schema, and/or the statistical metric.

Also at step 606, model optimizer 104 may implement a data classification model, consistent with disclosed embodiments. The data classification model may segment a cluster of connected datasets comprising the selected dataset based on the plurality of edges. In some embodiments, the segmenting may be based on at least one of a statistical metric, a data schema, a foreign key, a data label, an analysis goal, or an analysis topic. The label may indicate that a data element is actual data, synthetic data, or another category of data.

In some embodiments, segmenting the cluster of connected datasets at step 606 includes labelling data in the cluster of connected datasets, and or removing data based on a label. For example, step 606 may include removing data that is labelled as at least one of synthetic data, derived data, or irrelevant data. In some embodiments, a received dataset in the cluster of connected datasets may comprise labelled data, and segmenting may be based on the received, labelled data.

At step 608, model optimizer 104 provides one or more dataset clustering results, consistent with disclosed embodiments. A dataset clustering result may include a label, metadata, a classification, or other information indicating whether a dataset belongs to a category or cluster and may include a dataset (e.g., a clustered or segmented dataset). Step 608 may include transmitting a dataset clustering result to another component of system 100 and/or to a component or device outside system 100 (e.g., via interface 106). Step 608 may include providing a dataset clustering result to a model as part of a process (e.g., process 300, process 400). Providing a dataset clustering result may include storing the result in a data storage, consistent with disclosed embodiments.

Figure 7:
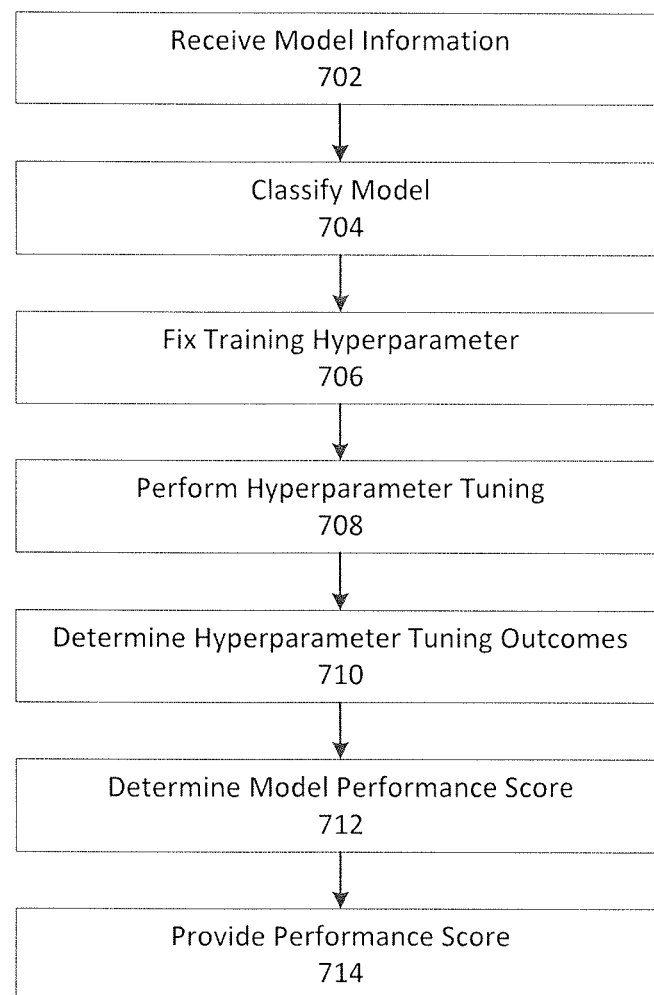
FIG. 7 depicts an exemplary process for determining model performance, consistent with disclosed embodiments.

FIG. 7 is a diagram of exemplary process 700 for determining model performance, consistent with disclosed embodiments. In some embodiments, model optimizer 104 performs process 700. One or more of model-training module 236, dataset-connector module 237, model-clustering module 238, or model-optimization module 239 may perform operations of process 700, consistent with disclosed embodiments. It should be noted that other components of system 100, including, for example, client device 102 may perform one or more steps of process 700.

Consistent with disclosed embodiments, steps of process 700 may be performed on one or more cloud services using one or more ephemeral container instances. For example, at any of the steps of process 700, model optimizer 104 may generate (spin up) an ephemeral container instance to execute a task, assign a task to an already-running ephemeral container instance ("warm container instance"), or terminate a container instance upon completion of a task. As one of skill in the art will appreciate, steps of process 700 may be performed as part of an API call.

At step 702, model optimizer 104 receives model information, consistent with disclosed embodiments. The information may be received from, for example, client device 102 and/or via interface 106. The information may include a model and/or a dataset. In some embodiments, the model is a machine learning model. The dataset may include real (actual) data and/or synthetic data, consistent with disclosed embodiments. In some embodiments, the information includes instructions to generate a model and may include model parameters, hyperparameters, or other model characteristics. In some embodiments, the information includes instructions to retrieve a model and/or a dataset from a data storage (e.g., data 231, model storage 108, and/or database 110). The information may include instructions to generate or retrieve a model based on a desired outcome and a dataset (or a dataset cluster or other dataset characteristic), consistent with disclosed embodiments.

At step 704, model optimizer 104 classifies the model, consistent with disclosed embodiments. Classifying the model may include determining a model characteristic and/or determining that a model belongs to a cluster, consistent with disclosed embodiments. In some embodiments, the model may be classified based on a training dataset used to train the model.

At step 706, model optimizer 104 fixes one or more training hyperparameters of the received model, consistent with disclosed embodiments. For example, model optimizer 104 may set at least one of learning rate, batch size, number of training batches, number of epochs, chunk size, time window, input noise dimension, or the like.

At step 708, model optimizer 104 performs hyperparameter tuning, consistent with disclosed embodiments. For example, model optimizer 104 may tune a an architectural hyperparameter of the received model and train the model according to the one or more fixed training hyperparameter. Hyperparameter tuning may include iteratively selecting a hyperparameter and training model parameters using the hyperparameter until a training criterion is satisfied, consistent with disclosed embodiments.

At step 710, model optimizer 104 determines one or more hyperparameter tuning outcomes, consistent with disclosed embodiments.

At step 712, model optimizer 104 determines one or more model performance scores based on the one or more hyperparameter tuning outcomes, consistent with disclosed embodiments. A performance score may include a brittleness score, an accuracy score, and/or a training time score.

At step 714, model optimizer 104 provides one or more model performance scores, consistent with disclosed embodiments. Providing a performance score may include storing the performance score in a data storage, transmitting the performance score to another component of system 100, and/or transmitting the performance score to systems or devices external to system 100 (e.g., via interface 106). Providing a performance score may include presenting the performance score by a display, playing a notification, or the like (e.g., via I/O devices 220 and/or interface 106).

It should be noted that steps of process 700 and process 400 may be performed in coordination. For example, one or more model performance scores of step 412 in process 400 may be based on the one or more training outcomes of step 410 and the one or more hyperparameter tuning outcomes of step 710 in process 700. Similarly, one or more model performance scores of step 712 may be based on the one or more hyperparameter tuning outcomes of step 710 of process 700 and the one or more training outcomes of step 412 of process 400.

Systems and methods disclosed herein involve unconventional improvements over conventional data processing approaches. Descriptions of the disclosed embodiments are not exhaustive and are not limited to the precise forms or embodiments disclosed. Modifications and adaptations of the embodiments will be apparent from consideration of the specification and practice of the disclosed embodiments. Additionally, the disclosed embodiments are not limited to the examples discussed herein. It should be noted that client device 102 may perform any of the features or steps described above in regard to model optimizer 104 in reference to the various embodiments and processes.

The foregoing description has been presented for purposes of illustration. It is not exhaustive and is not limited to the precise forms or embodiments disclosed. Modifications and adaptations of the embodiments will be apparent from consideration of the specification and practice of the disclosed embodiments. For example, the described implementations include hardware and software, but systems and methods consistent with the present disclosure can be implemented as hardware alone.

Computer programs based on the written description and methods of this specification are within the skill of a software developer. The various functions, scripts, programs, or modules can be created using a variety of programming techniques. For example, programs, scripts, functions, program sections or program modules can be designed in or by means of languages, including JAVASCRIPT, C, C++, JAVA, PHP, PYTHON, RUBY, PERL, BASH, or other programming or scripting languages. One or more of such software sections or modules can be integrated into a computer system, non-transitory computer-readable media, or existing communications software. The programs, modules, or code can also be implemented or replicated as firmware or circuit logic.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as non-exclusive. Further, the steps of the disclosed methods can be modified in any manner, including by reordering steps or inserting or deleting steps. It is intended, therefore, that the specification and examples be considered as exemplary only, with a true scope and spirit being indicated by the following claims and their full scope of equivalents.

What is claimed is:

1. A system for generating a preferred model, the system comprising:
    at least one hardware memory storing instructions; and
    one or more hardware processors that execute the instructions to perform operations comprising:
        receiving a model characteristic of a received model, the received model comprising a machine learning model;
        classifying the received model based on the model characteristic;
        identifying a fixed training hyperparameter based on the classification and architectural hyperparameters based on the classification;
        generating a tuned model by performing hyperparameter tuning of the received model according to the fixed training hyperparameter;
        determining a brittleness score of the tuned model based on a percent of training runs that reach a converge outcome based on one or more training criteria;
        comparing the brittleness score of the tuned model to a brittleness score of a different model; and
        generating the preferred model based on the comparison and the tuned model or the different model.

2. The system of claim 1, wherein the hyperparameter tuning is a first hyperparameter tuning and the operations further comprise:
    generating the different model by performing a second hyperparameter tuning of the received model according to the fixed training hyperparameter; and
    determining a brittleness score of the different model.

3. The system of claim 1, the operations further comprising:
    generating a plurality of parameter seeds for the tuned model; and
    generating the plurality of convergence outcomes of the tuned model, based on the parameter seeds,
    wherein determining the brittleness score of the tuned model is based on the convergence outcomes.

4. The system of claim 3, wherein the parameter seeds comprise randomly-generated parameter seeds.

5. The system of claim 1, wherein the different model is a reference model.

6. The system of claim 1, the operations further comprising providing the brittleness score of the tuned model with an activation function.

7. The system of claim 1, wherein the brittleness score is determined based on a variance of the architectural parameters.

8. The system of claim 1, wherein generating the preferred model comprises training the tuned model.

9. The system of claim 1, wherein classifying the received model includes determining that the model belongs to a cluster of models, and the fixed hyperparameter is associated with the cluster.

10. The system of claim 1, the operations further comprising generating an accuracy score of the tuned model, and wherein generating the preferred model is further based on the accuracy score.

11. The system of claim 1, the operations further comprising generating a training-time score of the tuned model, and wherein generating the preferred model is further based on the training-time score.

12. The system of claim 1, wherein determining the brittleness score of the tuned model is based on a plurality of convergence outcomes associated with one or more training runs, the plurality of convergence outcomes indicating whether the tuned model generates new parameter values or is associated with a loss function that falls below a threshold.

13. The system of claim 1, wherein comparing the brittleness score of the tuned model to a brittleness score of the different model comprises retrieving the brittleness score of the different model from storage.

14. The system of claim 1, the operations further comprising identifying the different model, and determining a reference brittleness score of the different model.

15. The system of claim 1, wherein the model characteristic comprises a model parameter.

16. The system of claim 1, wherein the model characteristic comprises a model type.

17. The system of claim 1, wherein the received model is a synthetic data generation model.

18. The system of claim 1, wherein classifying the received model is based on a training dataset previously used to train the received model.

19. A method for generating a preferred model, the method comprising:
    receiving a model characteristic of a received model, the received model comprising a machine learning model;

classifying the received model based on the model characteristic;
identifying a fixed training hyperparameter based on the classification and architectural hyperparameters based on the classification;
generating a tuned model by performing hyperparameter tuning of the received model according to the fixed training hyperparameter;
determining a brittleness score of the tuned model based on a percent of training runs that reach a converge outcome based on one or more training criteria;
comparing the brittleness score of the tuned model to a brittleness score of a different model; and
generating the preferred model based on the comparison and the tuned model or the different model.

20. A system for generating a preferred model, the system comprising:
at least one hardware memory storing instructions; and
one or more hardware processors that execute the instructions to perform operations comprising:
receiving a model characteristic of a received model, the received model comprising a machine learning model;
classifying the received model based on the model characteristic;
identifying a fixed training hyperparameter based on the classification and architectural hyperparameters based on the classification;
generating a tuned model by performing hyperparameter tuning of the received model according to the fixed training hyperparameter;
determining a brittleness score of the tuned model based on a percent of training runs that reach a converge outcome based on one or more training criteria;
comparing the brittleness score of the tuned model to a brittleness score of a different model; and
generating the preferred model based on the comparison and the tuned model or the different model.

* * * * *